United States Patent
Miyamoto

(10) Patent No.: US 8,261,123 B2
(45) Date of Patent: Sep. 4, 2012

(54) INFORMATION PROCESSING APPARATUS AND DISPLAY CONTROL METHOD

(75) Inventor: Daijiro Miyamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 244 days.

(21) Appl. No.: 12/683,970

(22) Filed: Jan. 7, 2010

(65) Prior Publication Data

US 2010/0180164 A1    Jul. 15, 2010

(30) Foreign Application Priority Data

Jan. 9, 2009    (JP) ................. 2009-003627

(51) Int. Cl.
*G06F 11/00*    (2006.01)
(52) U.S. Cl. ............... 714/5.1; 714/57; 714/44
(58) Field of Classification Search ............ 714/44
See application file for complete search history.

(56) References Cited

U.S. PATENT DOCUMENTS

| | | | | | |
|---|---|---|---|---|---|
| 5,859,978 | A * | 1/1999 | Sonderegger et al. | ........ | 709/226 |
| 7,062,158 | B1 * | 6/2006 | Ayaki | ............. | 386/248 |
| 7,275,150 | B2 * | 9/2007 | Pagan | .............. | 713/1 |
| 2004/0263906 | A1 * | 12/2004 | Uchida et al. | ............ | 358/1.18 |
| 2005/0018236 | A1 * | 1/2005 | Shirai et al. | .............. | 358/1.14 |
| 2006/0028677 | A1 * | 2/2006 | Isshiki et al. | ............. | 358/1.15 |
| 2006/0028678 | A1 * | 2/2006 | Negishi et al. | ............. | 358/1.15 |
| 2006/0279766 | A1 * | 12/2006 | Kobayashi | ............. | 358/1.14 |
| 2007/0206225 | A1 * | 9/2007 | Shinohara et al. | ........... | 358/1.16 |
| 2007/0216940 | A1 * | 9/2007 | Kobayashi | ................. | 358/1.15 |
| 2008/0016397 | A1 * | 1/2008 | Pagan | ............. | 714/36 |
| 2008/0059539 | A1 * | 3/2008 | Chin et al. | ................. | 707/203 |
| 2008/0231900 | A1 * | 9/2008 | Abe | ............ | 358/1.16 |
| 2008/0312861 | A1 * | 12/2008 | Casto et al. | .................. | 702/85 |
| 2008/0313360 | A1 * | 12/2008 | Abe | ............ | 710/18 |
| 2008/0316517 | A1 * | 12/2008 | Sato | ........... | 358/1.13 |
| 2009/0046318 | A1 * | 2/2009 | Sakikawa | ................ | 358/1.15 |
| 2009/0147290 | A1 * | 6/2009 | Tomita | .......... | 358/1.9 |
| 2009/0235126 | A1 * | 9/2009 | Hosouchi | ............. | 714/57 |
| 2010/0097628 | A1 * | 4/2010 | Masuda | .................. | 358/1.14 |
| 2010/0142002 | A1 * | 6/2010 | Imai | .............. | 358/2.1 |
| 2010/0245899 | A1 * | 9/2010 | Hirama | .................. | 358/1.15 |

FOREIGN PATENT DOCUMENTS

JP    2007-249327 A    9/2007

\* cited by examiner

*Primary Examiner* — Kamini Patel

(74) *Attorney, Agent, or Firm* — Canon USA, Inc., IP Division

(57) ABSTRACT

An information processing apparatus which manages a document file to be stored includes a creating unit for creating an output job which is output to an image forming apparatus according to an instruction to an icon of the document file displayed on a display unit, a job management unit for managing the output job by relating a job ID for identifying the output job to a file ID of the document file when the output job is created by the creating unit, an acquirement unit for acquiring from the image forming apparatus the job ID of the output job in which processing ends in error, and a first display control unit for changing an icon display state of an a document file including a file ID specified by the job ID acquired by the acquirement unit and the job ID managed by the management unit, from a normal display state to an error display state.

18 Claims, 17 Drawing Sheets

FIG. 5A

JOB INFORMATION LIST

| JOB ID | FILE ID | JOB STATE |
|--------|---------|-----------|
| J001   | F501    | IN SENDING |
| J002   | F201    | IN IDLING |

ERROR JOB LIST

| JOB ID | FILE ID |
|--------|---------|
| J003   | F044    |
| J012   | F111    |

STORAGE MEDIUM SUCH AS FD/CD-ROM

| DIRECTORY INFORMATION |
|---|
| PROGRAM CODE CORRESPONDING TO STEPS OF FLOW CHART ILLUSTRATED IN FIG. 9 |
| PROGRAM CODE CORRESPONDING TO STEPS OF FLOW CHART ILLUSTRATED IN FIG. 10 |
| PROGRAM CODE CORRESPONDING TO STEPS OF FLOW CHART ILLUSTRATED IN FIG. 11 |
| PROGRAM CODE CORRESPONDING TO STEPS OF FLOW CHART ILLUSTRATED IN FIG. 12 |
| PROGRAM CODE CORRESPONDING TO STEPS OF FLOW CHART ILLUSTRATED IN FIG. 13 |
| PROGRAM CODE CORRESPONDING TO STEPS OF FLOW CHART ILLUSTRATED IN FIG. 14 |
| PROGRAM CODE CORRESPONDING TO STEPS OF FLOW CHART ILLUSTRATED IN FIG. 16 |

INFORMATION PROCESSING APPARATUS AND DISPLAY CONTROL METHOD

BACKGROUND OF THE INVENTION

1. Field of the Invention

The present invention relates to an information processing apparatus which manages document files.

2. Description of the Related Art

In a document management system which manages document files, document processing such as creation, editing, deletion, and addition of search/additional information which enables a user to easily find out a desired document file is conventionally performed. With the above processing, the document management system can effectively manage the document files.

On the other hand, there is a job management system which converts a document file, which instructs to perform printing or transmitting via facsimile, into a format which can be interpreted by an image forming apparatus and displays job data, to which information about a paper size or a number of copies is added, in a form of a list, in the processing for printing or facsimile transmission of a document file.

For example, in a job management system discussed in Japanese Patent Laid-open No. 2007-249327, a present state (in printing or in error) and a location of a source file where the job data is generated are displayed as additional information of the job data.

However, in the conventional document management system, when, for example, a facsimile transmission is performed, a user cannot see a completion result of facsimile transmission on the document management system.

Accordingly, when the facsimile transmission is not completed by an error, the user cannot notice occurrence of the error.

Consequently, in order to check the occurrence of the error, the user needs to refer to the job management system to confirm a result of the facsimile transmission.

However, in the job management system, when processing to edit the document file or to change a destination is required, the user needs to specify a location of the source file based on the job data about which the error occurred. Since the user needs to perform processing via the document management system on the source file of the job data about which the error occurred, such processing requires a complicated operation.

SUMMARY OF THE INVENTION

The present invention relates to a mechanism which enables a user to confirm occurrence of an error in an output document file with reference to a display state of an icon of the document file on a screen on which the document file is managed.

According to a first aspect of the present invention, an information processing apparatus which manages a document file to be stored includes a creating unit configured to create an output job which is output to an image forming apparatus according to an instruction to an icon of the document file displayed on a display unit, a job management unit configured to manage the output job by relating a job ID for identifying the output job to a file ID of the document file when the output job is created by the creating unit, an acquirement unit configured to acquire from the image forming apparatus the job ID of the output job in which processing ends in error, and a first display control unit configured to change an icon display state of an a document file including a file ID which is specified by the job ID acquired by the acquirement unit and the job ID managed by the management unit, from a normal display state to an error display state.

According to a second aspect of the present invention, an information processing apparatus which manages a document file stored in a folder includes a creating unit configured to create an output job which is output to an image forming apparatus according to an instruction to an icon of the document file displayed on a display unit, a job management unit configured to manage the output job by relating a job ID for identifying the output job to a file ID of the document file when the output job is created by the creating unit, an acquirement unit configured to acquire from the image forming apparatus the job ID of the output job in which processing ends in error, and a first display control unit configured to change icon display states of a document file including a file ID which is specified by the job ID acquired by the acquirement unit and the job ID managed by the management unit and an icon of a folder in which the document file is stored, from a normal display state to an error display state.

Further features and aspects of the present invention will become apparent from the following detailed description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 5A and 5B, respectively, illustrates an example of a data structure in which information for associating the document file with an output state thereof is stored in the document management system according to the exemplary embodiment of the present invention.

FIG. 17 illustrates a memory map of a storage medium which stores various data processing programs readable by the information processing apparatus of the present invention.

DESCRIPTION OF THE EMBODIMENTS

Various exemplary embodiments, features, and aspects of the invention will be described in detail below with reference to the drawings.

Figure 1:
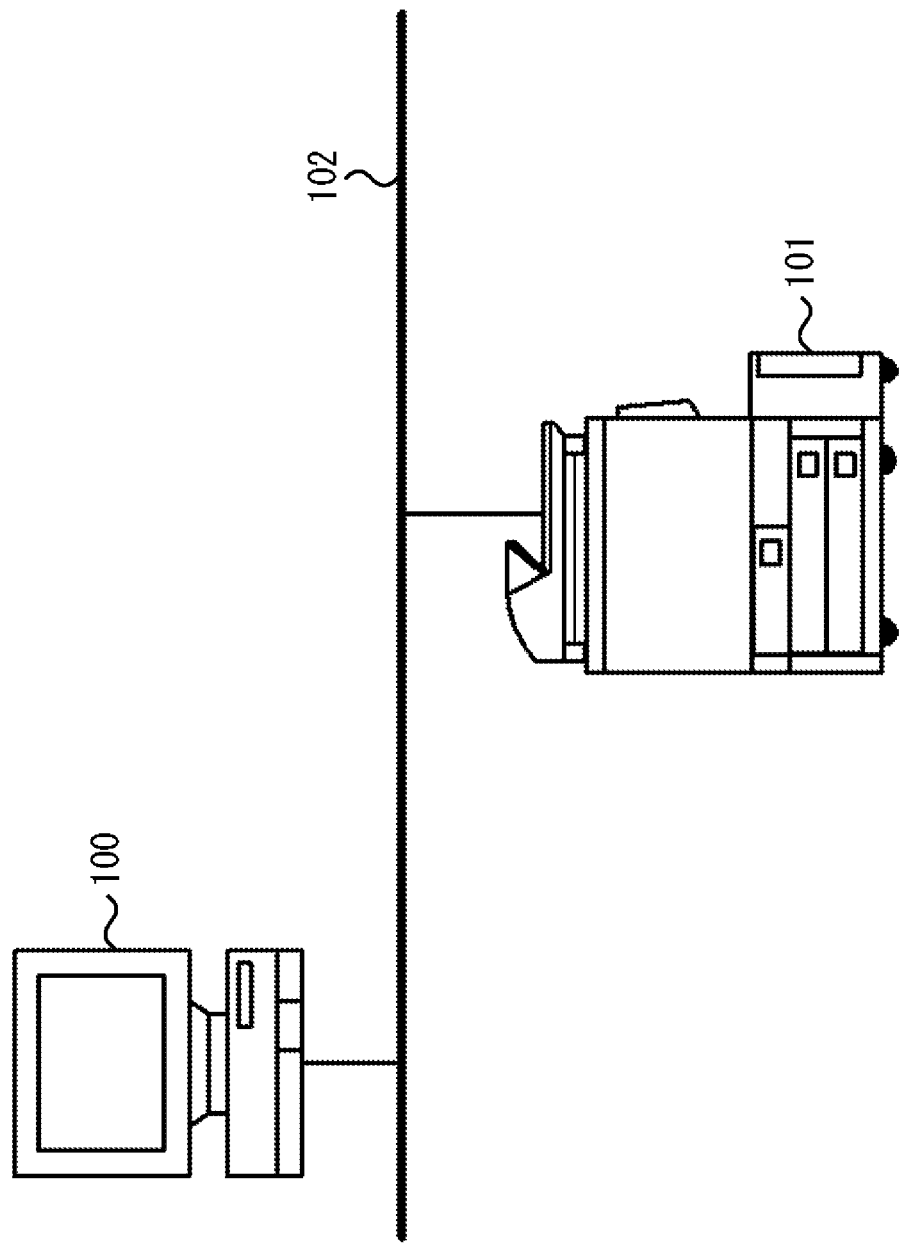
FIG. 1 illustrates a configuration of an information processing system according to an exemplary embodiment of the present invention.

FIG. 1 illustrates a configuration of an information processing system according to a present exemplary embodiment. FIG. 1 illustrates an example of the information processing system in which an information processing apparatus 100 outputs a job to an image forming apparatus 101 which is connected to a network 102.

Figure 2:
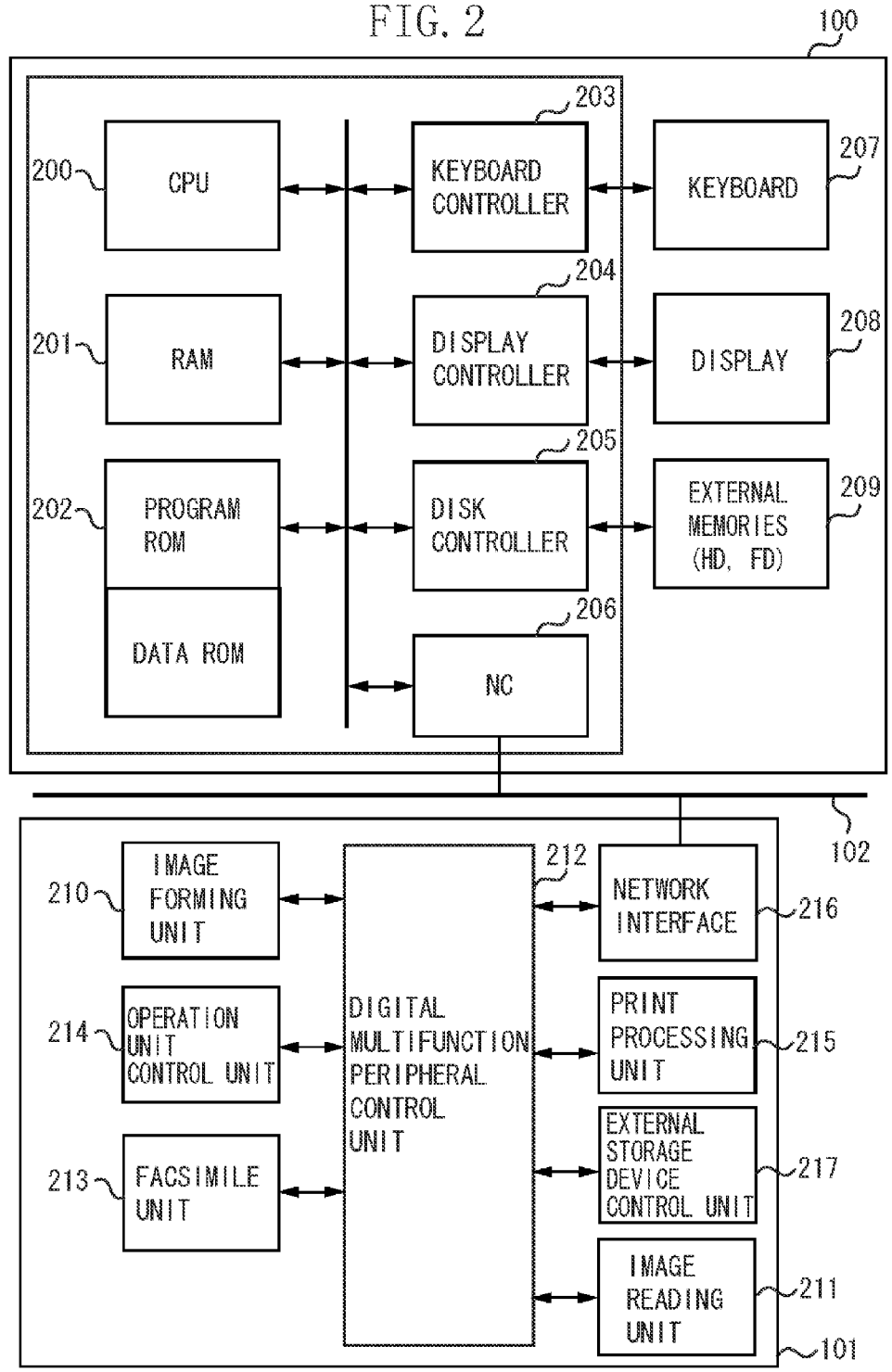
FIG. 2 is a block diagram illustrating a configuration of the information processing system of FIG. 1.

In FIG. 1, the information processing apparatus 100 includes hardware resources of FIG. 2 and performs data processing in which various programs such as a stored application program are executed. When a print request is issued from an application, a job data is output to the image forming apparatus 101 via a printer driver or a facsimile driver which is installed in the information processing apparatus 100.

In the present exemplary embodiment, the information processing apparatus 100 is connected to the network 102 such as an Ethernet. By using the network, the information processing apparatus 100 causes the image forming apparatus to perform printing or facsimile transmission via the printer driver or the facsimile driver which converts document data into job data which can be interpreted by the image forming apparatus.

The image forming apparatus 101 includes a network interface and is connected to the network 102 via the network interface. The image forming apparatus 101 analyses the job data received from the information processing apparatus 100 to convert the job data into an image and performs printing or facsimile transmission of the image.

FIG. 2 is a block diagram illustrating a configuration of the information processing system of FIG. 1. A hardware configuration of the information processing apparatus 100 illustrated in FIG. 2 is equivalent to a hardware configuration of a general information processing apparatus. Therefore, the hardware configuration of the general information processing apparatus can be applied to the information processing apparatus according to the present exemplary embodiment.

In FIG. 2, a central processing unit (CPU) 200 executes an operating system (OS) or a program such as an application which is stored in a read only memory (ROM) for a program of a ROM 202 or loaded to a random access memory (RAM) 201 from an external memory 209. The OS is an abbreviation for an operating system which runs on a computer and the operating system is referred to as the "OS" in the following description. Processing in each of flowcharts, which will be described below, can be realized by executing the program.

The RAM 201 functions as a main memory of the CPU 200 or a work area. A keyboard controller 203 controls a key input via a keyboard 207 or a pointing device (not shown).

A display controller 204 controls various displays on a display 208. A disk controller 205 controls a data access to the external memory 209 such as a hard disk (HD) or a flexible disk (FD), which stores various data.

A network controller (NC) 206 is connected to a network and executes communication control processing with other devices which are connected via the network.

The image forming apparatus 101 is configured to be able to execute a printing function, a copying function, a scanner function, and a facsimile communication function.

An image forming unit 210 executes a series of image forming processing, such as handling of paper and image transfer/fixing, to form an image on a recording medium such as a recording sheet. The image forming unit 210 includes, for example, an ink jet printer or an electrophotographic image forming unit.

An image reading unit 211 includes a scanner and the others. The image reading unit 211 optically reads a document image to convert the document image into digital image information. The image reading unit 211 outputs the digital image information to the image forming unit 210 to form an image. Further, the image reading unit 211 is configured to allow a facsimile unit 213 and a network interface 216 to transmit the image data. In other words, the facsimile unit 213 is connected to a public line (public switched telephone network (PSTN)) to perform transmission and reception processing of the image data with an external facsimile machine.

A digital multifunction peripheral control unit 212 controls an operation of each of the image forming unit 210 and the image reading unit 211, for example, to control the image forming unit 210 to copy document information read by the image reading unit 211.

Further, the digital multifunction peripheral control unit 212 includes the network interface 216, a print processing unit 215, the facsimile unit 213 and an operation unit control unit 214, and controls information communication among these units.

The facsimile unit 213 can execute transmission and reception of a facsimile image, i.e., can send digital image information read by the image reading unit 211 and decode a received facsimile signal to be recorded by the image forming unit 210.

The operation unit control unit 214 generates a signal according to an operation of a user who uses an operation panel of an operation unit and controls the operation unit to cause a display unit to display various data or messages.

The print processing unit 215 performs control, for example, to process print data input via the network interface 216 and output the print data to the image forming unit 210 to print the print data. The network interface 216 controls data transmission and reception with other communication terminals via a communication line.

An external storage device control unit 217 can convert, by using the image forming unit 210, an image read by the image reading unit 211 into a data format which can be stored in the external storage device and store thus converted data in the external storage device.

Further, the external storage device control unit 217 can read the stored data to print it by the image forming unit 210 and send the data to external devices via the network interface 216.

Figure 3:
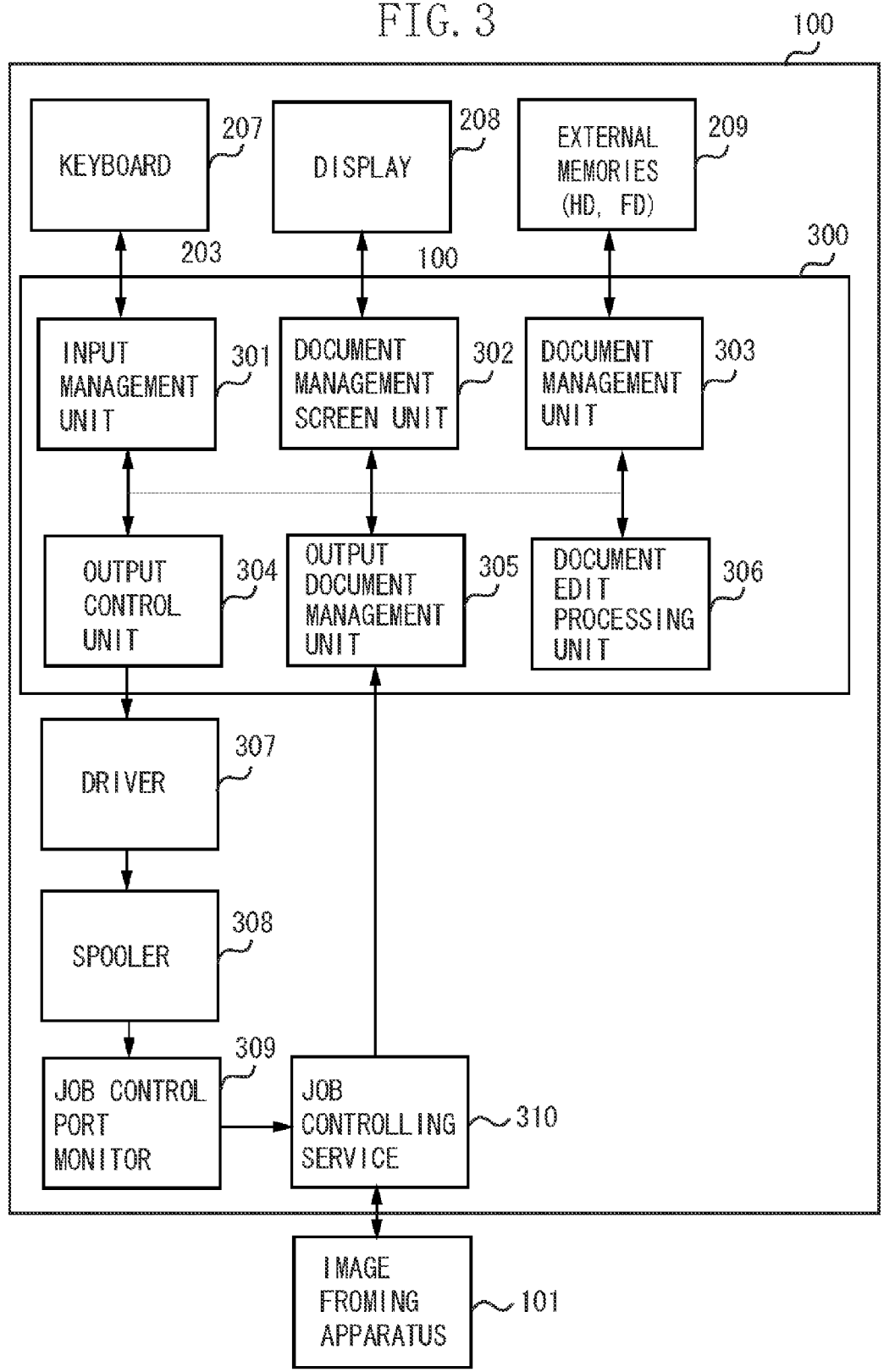
FIG. 3 illustrates an example of a software configuration of an information processing apparatus in the document management system according to the exemplary embodiment of the present invention.

FIG. 3 illustrates an example of a software configuration of the information processing apparatus in the document management system according to the exemplary embodiment of the present invention. In the present system, document files to be stored in the external memory 209 are managed with a hierarchical structure, e.g., a tree structure. Thus, on a user interface displayed on the display 208 by a document management screen unit 302, a location of each of the document files stored in the external memory 209 is controlled to be displayed in a form of an icon of the folder or an icon of the document file.

In FIG. 3, a document management system 300 includes an input management unit 301, the document management screen unit 302, a document management unit 303, an output control unit 304, an output document management unit 305 and a document edit processing unit 306.

The input management unit 301 detects an input via the keyboard 207 or a mouse, issues to the document management unit 303 a storage/acquirement request of a document file according to the input content, and requests the output control unit 304 to perform output processing, i.e., printing or facsimile transmission.

The document management screen unit 302 causes the display 208 to display the user interface of the document management system 300. Examples of the user interface include user interfaces which are illustrated in the below described FIGS. 6 through 8.

The document management unit 303 performs storage processing or reading processing of the document file in/from the external memory 209. The storage or reading processing of the document file comes to be necessary as a result of editing of the document file on the document management system 300.

The output control unit 304 converts the document file, which is requested to be output, into a series of rendering commands that can be interpreted by a driver 307 and sends the series of rendering commands to the driver 307.

The output document management unit 305 receives job information from the job controlling service 310 which monitors job data after performing printing or facsimile transmission and requests the document management screen unit 302 to display the job information.

Output job monitoring processing, when an output request is issued by the output control unit 304 of the document management system 300, is described with reference to FIG. 3.

When the document management system 300 receives a print instruction, the document management system 300 generates a series of rendering commands via the operating system (OS). The driver 307, which received the rendering commands generated via the OS, creates a print job including a page description language (PDL) file which can be interpreted by the image forming apparatus 101 based on the series of rendering commands.

The PDL driver is exemplified in the following description, but not limited thereto. For example, the present invention is applicable to a band description language (BDL), a printer driver which generates a compressed bitmap data or an embodiment which generates print data by an application and an OS without using a printer driver.

The driver 307 passes a print job or a storage job which is to be sent to the image forming apparatus 101 to a spooler 308. In the present exemplary embodiment, it is assumed that Windows manufactured by the Microsoft Corporation is used as the OS, the spooler 308 is a Windows Spooler.

The present invention can be applicable not only to the Windows as the OS but also to any OS as far as that has a rendering order.

The spooler 308 passes the print job to a job control port monitor 309 which is selected and instructed by the user via the user interface displayed on the display 208 and causes the image forming apparatus 101 to send the print job.

In this description, it is assumed that the user designates the job control port monitor 309 which transfers the print data to the job controlling service 310 in advance and issue a print instruction. Print setting information, such as a paper size or staple instruction, which is set via the user interface of the printer driver is also sent to the job control port monitor 309. The job control port monitor 309 transmits the print job to the job controlling service 310.

The job controlling service 310 has a function to manage information such as device state information and job state information which are notified from the image forming apparatus 101. When the job controlling service 310 receives the print job from the job control port monitor 309, the job controlling service 310 requests the image forming apparatus 101 to perform printing.

When the image forming apparatus 101 confirms completion of printing of the print data, the image forming apparatus 101 notifies the job controlling service 310 of completion of printing or of a state of the image forming apparatus 101.

The job controlling service 310 notifies the output document management unit 305 of the job state, i.e., completion of printing, acquired from the image forming apparatus 101. Accordingly, the document management system 300 displays, on the display 208, an output state of printing or facsimile transmission according to the document file via the document management screen unit 302.

Notification from the image forming apparatus 101 includes completion notification indicating a normal termination of printing or facsimile transmission, in-printing notification indicating of an in-printing state, and in-sending notification indicating an in-transmitting state. Further, the notification from the image forming apparatus 101 includes error termination notification indicating incompletion of printing or facsimile transmission due to a wrong address or defective print data.

Figure 4:
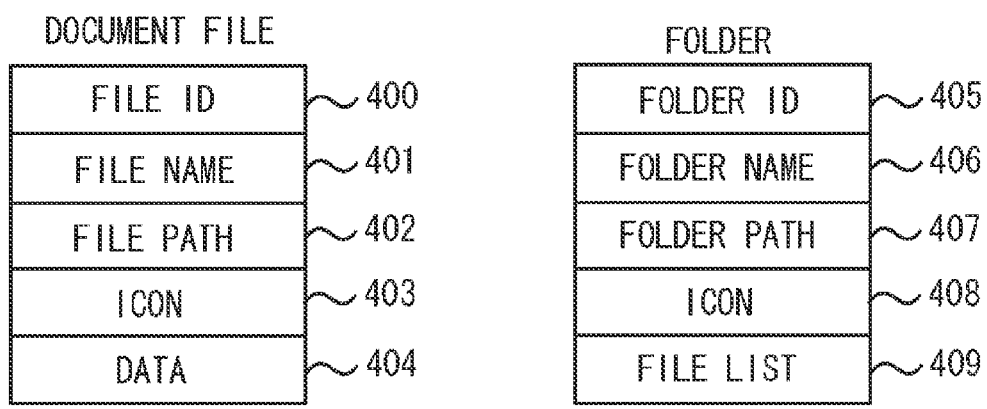
FIG. 4 illustrates an example of a data structure of a document file and a folder which stores the document file in the document management system according to the exemplary embodiment of the present invention.

FIG. 4 illustrates an example of data structures of a document file and a folder which stores the document file in the document management system according to the exemplary embodiment of the present invention.

In FIG. 4, a document file is stored in a folder and a file ID 400 of the document file is stored in a file list 409. In the folder, another folder can be nested. In this case, a folder ID 405 of the folder is stored in the file list 409.

The document file includes the file ID 400, a file name 401, a file path 402, an icon 403, and data 404. The file ID 400 is a number uniquely indicating the document file within the document management system.

The file name 401 is a name of the document file. A plurality of document files which have the same name can exist as far as those document files are not stored within the same folder.

The file path 402 indicates a location of the document file. The file path 402 is described by connecting the folders, in which the document file is stored, with a "¥" symbol. For example, in the Windows, in the case where a file having a folder name F2 is stored in a folder having a folder name F1 in a drive C on the hard disk, the file path is represented by C:¥F1¥F2.

The icon 403 is an image indicating a file. The icon 403 is, for example, an image indicating an application document or a reduced image of a document. The data 404 is file entity data.

A folder includes a folder ID 405, a folder name 406, a folder path 407, an icon 408, and the file list 409.

The folder ID 405 is a number uniquely indicating the folder within the document management system.

The file ID and the folder ID, respectively, are added with a value which can uniquely identify all the files and the folders within the document management system. The folder name 406 is a name of the folder.

The folder path 407 indicates a location of the folder. The location of the folder is represented by the same method as it is used for the file path 402. The icon 408 is an image representing the folder. The file list 409 stores files stored in the folder, and the file ID and a folder ID of the folder.

FIGS. 5A and 5B, respectively, illustrates an example of a data structure which stores information for relating a document file with an output state of the document file in the document management system according to the exemplary embodiment of the present invention. FIGS. 5A and 5B correspond to a job management table which is created by the output document management unit 305 in FIG. 3. More specifically, when an output job is created, the output document management unit 305 creates the job management table by job management processing in which a job ID for identifying the output job is related to a file ID of a document file to manage the output job.

In FIG. 5A, a job information list is a list of jobs in which output processing, such as printing or facsimile transmission, is not terminated. The job information list stores a job ID 500, a file ID 501 of a job generation source file of a job such as printing or facsimile transmission, and a job state 502 indicating a present state of the job as job information.

When the user makes a print request or a facsimile transmission request to the document management system 300, the job information list is created by the output document management unit 305 before the output control unit 304 sends a rendering command to the driver 307.

The file ID 501 of the job generation source file is stored in the above described job information list. Subsequently, when the rendering command is sent to the driver 307, the output document management unit 305 receives the job ID 500 added by the driver 307 and stores the job ID 500 to the job information list by relating to the file ID 501.

The job state 502 stores a value indicating a vacancy when a job is sent. The value is transmitted to the output document management unit 305 via the job controlling service 310 according to the job state which is notified from the image forming apparatus 101 as an event, and the content of the job state 502 is changed.

A piece of the job information in the job information list is deleted therefrom by the output document management unit 305 when processing, e.g., printing or facsimile transmission, of the job corresponding to the job ID 500 is completed or is terminated in error.

When a value in the job state 502 becomes a value indicating an abnormal termination in the job information list of FIG. 5A, the job ID 500 and the file ID 501 of the job information is stores in an error job list illustrated in FIG. 5B as error job information.

The document management screen unit 302 changes a display form of the user interface of the file which has the file ID 501 of the error job information listed in the error job list on the display 208 to an output error display.

The error job information is deleted from the error job list by the output document management unit 305 when a job is created again to the file which has the file ID 501 of the error job information and the job is normally terminated.

The error job information deletion processing can be performed according to editing of or reference with the file which has the file ID of the error job information or an instruction from the user in addition to when the job is normally output.

Figure 6:
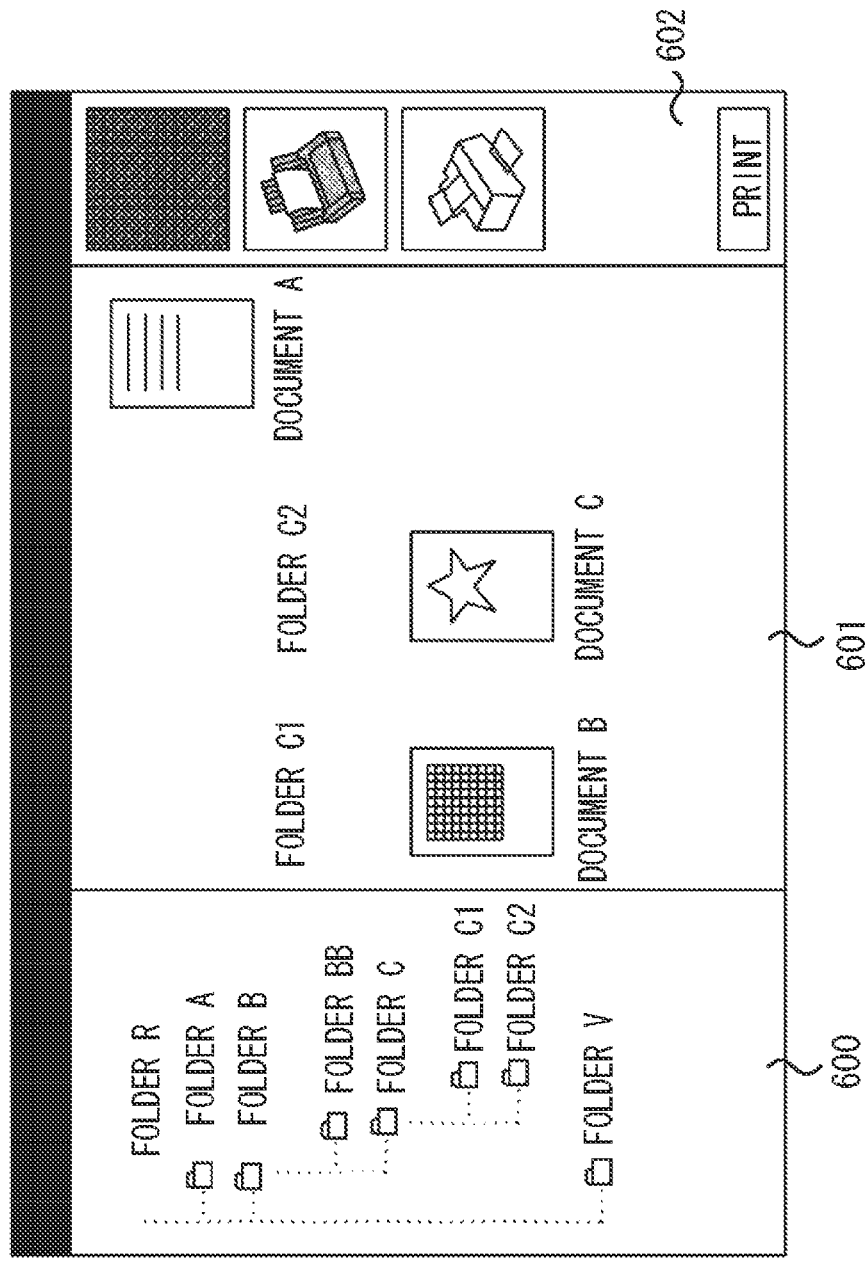
FIG. 6 illustrates an example of a user interface which is displayed by the information processing apparatus according to the exemplary embodiment of the present invention.

FIG. 6 illustrates an example of the user interface displayed by the information processing apparatus according to the exemplary embodiment of the present invention. Display contents of the screen illustrated in FIG. 6 is controlled by the document management screen unit 302 to be displayed on the display 208.

In FIG. 6, a folder structure screen 600 displays a folder structure in which the document file to be managed by the document management system is stored in a form of a hierarchical tree view.

A document editing screen 601 displays a file or a folder which is stored in an arbitrary folder selected in the folder structure screen 600 as an icon or a thumbnail. An output device list screen 602 lists up image forming apparatus which can perform outputting and displays a list of output devices which can issue an output instruction.

A structure of the screens and a display method of the present exemplary embodiment are not limited to those illustrated in the above examples. For example, files displayed in the document editing screen 601 may not be displayed with an icon or a thumbnail but may be displayed in a list of file names. The output device list screen 602 may not be always displayed and a print dialog may be displayed from menus of a toolbox.

Figure 7:
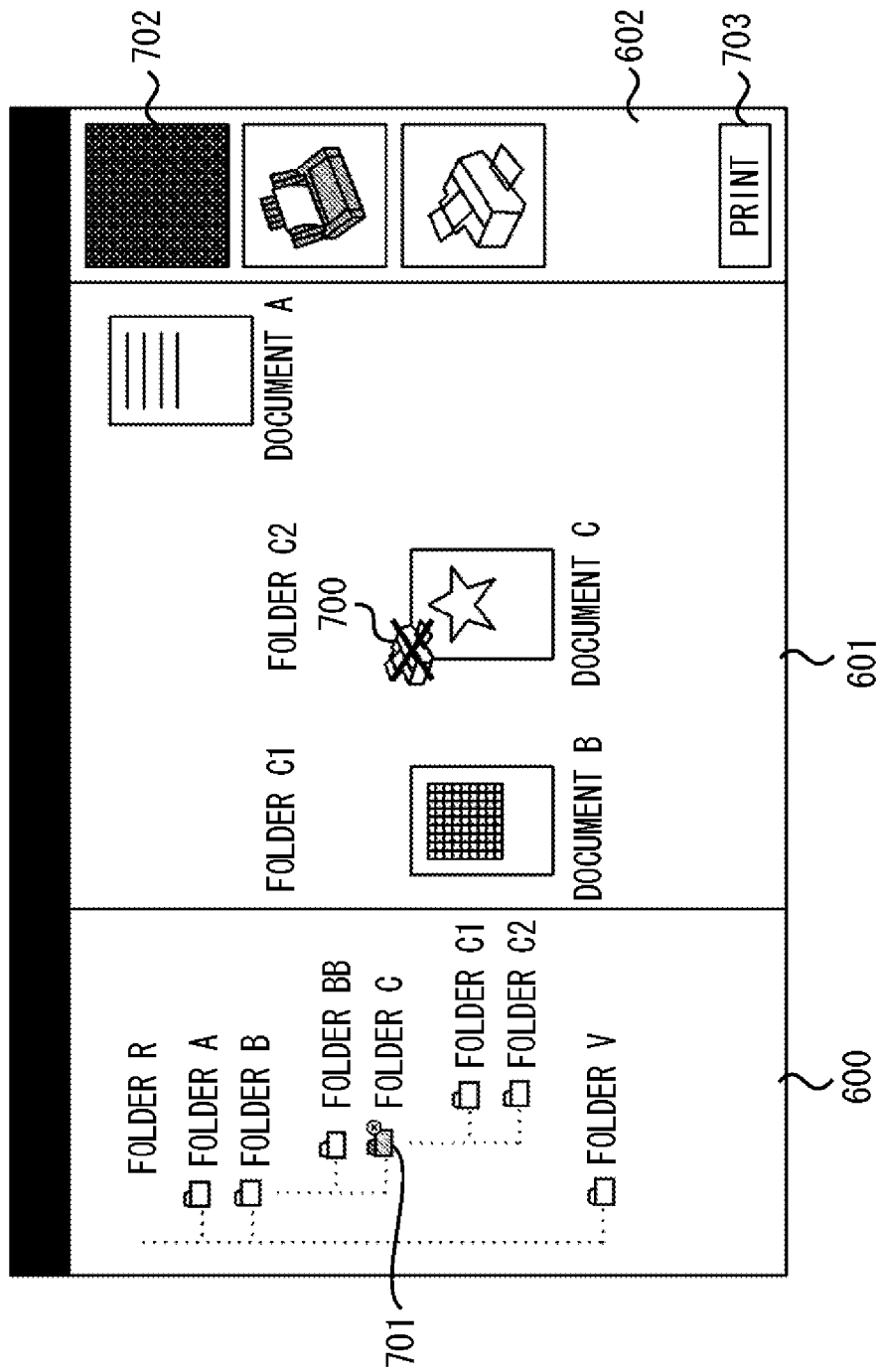
FIG. 7 illustrates an example of the user interface displayed by the information processing apparatus according to the exemplary embodiment of the present invention.

FIG. 7 illustrates an example of the user interface displayed by the information processing apparatus according to the exemplary embodiment of the present invention. Display content of the screen illustrated in FIG. 7 is controlled by the document management screen unit 302 to be displayed on the display 208. FIG. 7 illustrates an example of the user interface which is displayed when output processing such as printing or facsimile transmission is performed from the information processing apparatus 100 to the image forming apparatus 101 and the output processing could not be normally completed, i.e., was terminated in error, in the image forming apparatus 101.

FIG. 7 illustrates a state which is displayed when a notification is received from the image forming apparatus 101 that an error occurred and an output could not be normally terminated according to a document C which is designated by the user to be printed and displayed in the document editing screen 601 on the display 208.

When the information processing apparatus 100 receives the error notification from the image forming apparatus 101, the document management screen unit 302 displays an output error display 700 indicating occurrence of an error to the displayed document C. In FIG. 7, an error mark is added onto the thumbnail of the document C, so that the occurrence of the error is indicated. However, the occurrence of the error can be indicated by changing the thumbnail image, or changing a color or a font of the document name of the thumbnail.

In the folder structure screen 600, a display of the folder including the file in which the output error occurred is changed to an output error document existing display 701.

When the folder structure screen 600 is displayed in the form of the tree view, there is a case that the folder that stores the file in which the output error occurred is folded and is not displayed on the screen. In this case, the nearest folder in displayed folders in the screen is displayed with the output error document existing display 701 as illustrated in FIG. 8.

The user interface illustrated in FIG. 7 is displayed based on a first display control in which a display state of an icon of a document file including the file ID is changed from a normal display state to an error display state. This process is described in detail below with reference to FIG. 13.

Figure 8:
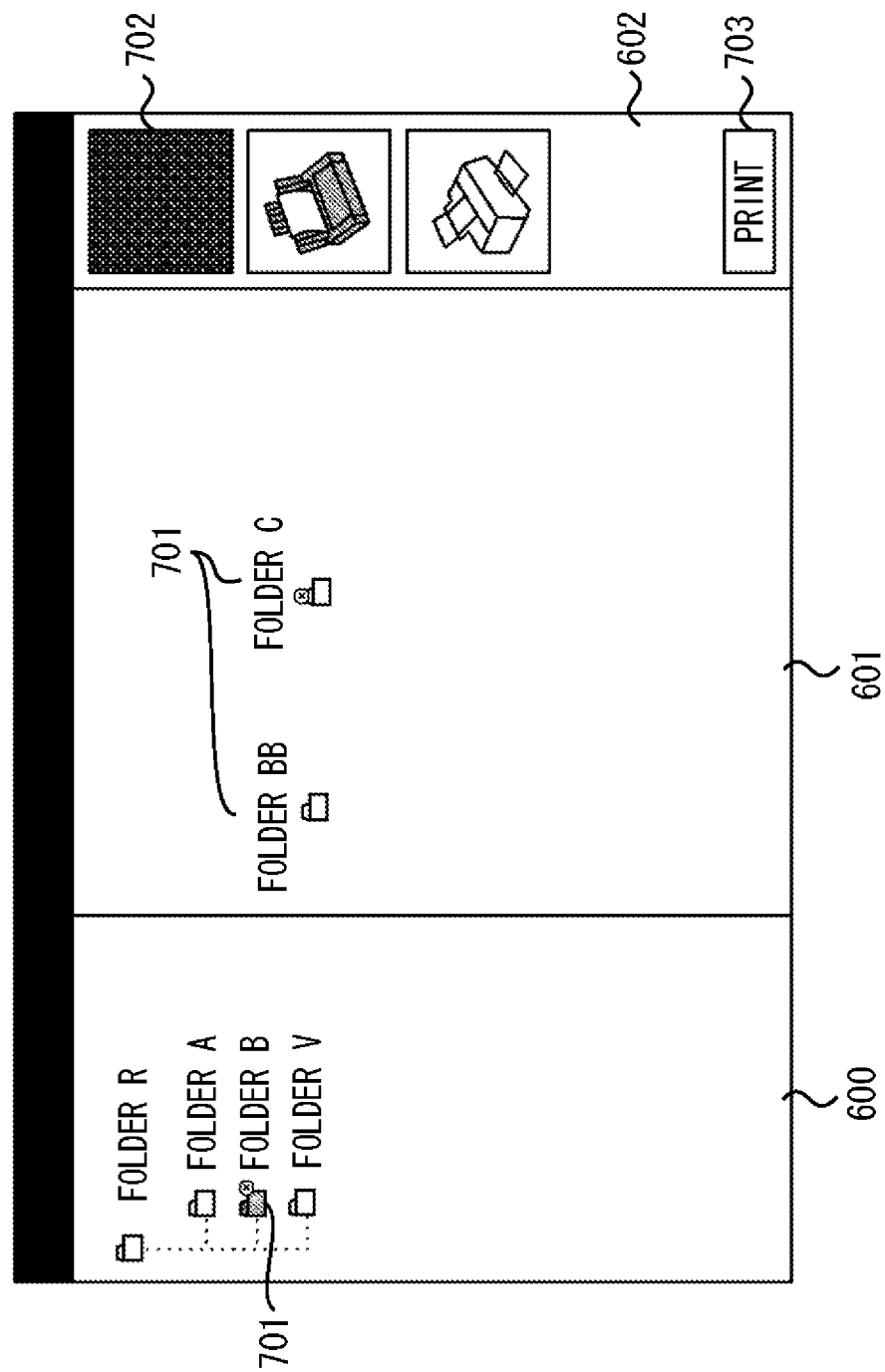
FIG. 8 illustrates an example of the user interface displayed by the information processing apparatus according to the exemplary embodiment of the present invention.

FIG. 8 illustrates an example of the user interface displayed by the information processing apparatus according to the exemplary embodiment of the present invention. The screen illustrated in FIG. 8 is an example of a display when a folder B and the hierarchically lower folders are folded while the document C of FIG. 7 is displayed with the output error display 700. In the folder structure screen 600 illustrated in FIG. 8, since the folder C, which includes a file of the output error display 700, is not displayed in the folder structure screen 600, the folder B which is in an upper layer of the folder C is displayed with the output error document existing display 701.

In the document editing screen 601, since the file of the output error display is included within the folder C, the folder C is displayed with the output error document existing display 701.

The user interface illustrated in FIG. 8 is displayed based on the first display control in which the display state of the icon of the document file including the file ID which is specified by the managed job ID and the icon of the folder in which the document file is stored are changed from the normal display state to the error display state. This process is described in detail below with reference to FIG. 13.

Figure 9:
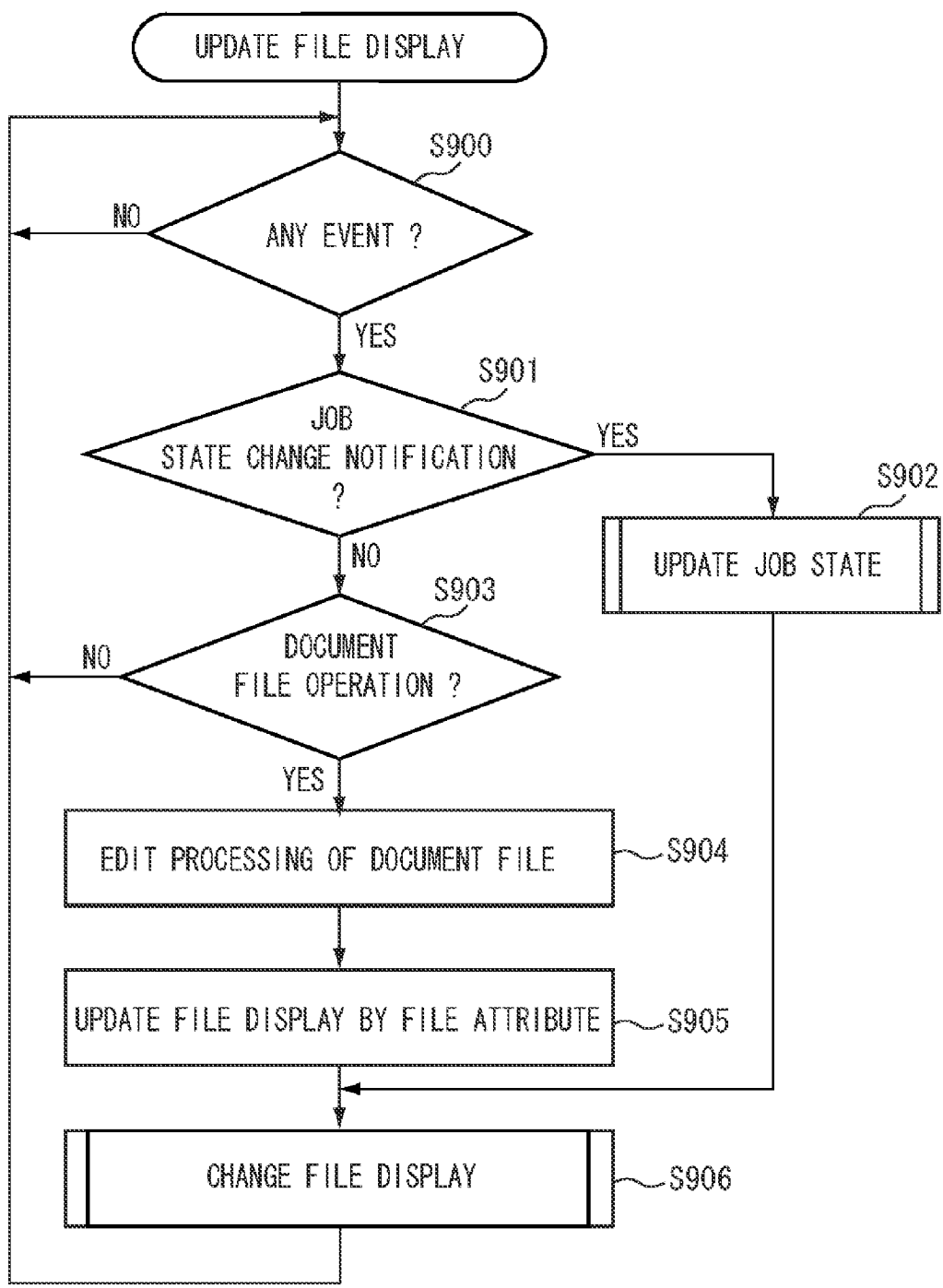
FIG. 9 is a flow chart illustrating an example of a data processing procedure in the information processing apparatus according to the exemplary embodiment of the present invention.

FIG. 9 is a flow chart illustrating an example of a data processing procedure in the information processing apparatus according to the exemplary embodiment of the present invention. FIG. 9 illustrates an example of processing for updating a display of the document file in the document processing system of FIG. 2. Steps S900 through S906 are each of steps of updating the display. Each step can be realized such that the CPU 200 of FIG. 2 loads a control program (including the document management system 300) onto the RAM 201 and executes the loaded control program.

In step S900, the output document management unit 305 determines whether event notification is generated from the OS or the like. The event is notified according to an operation by the user or processing of the OS. More specifically, when the user operates the keyboard or clicks a button displayed in the user interface provided by the document management system 300 by a mouse, the event is notified to the input management unit 301 of the document management system 300. The job controlling service 310 receives notification indicating a job state from the image forming apparatus 101 and notifies the output document management unit 305 of the job state as the event.

If the output document management unit 305 determines that the event notification is received (YES in step S900), the processing proceeds to step S901 to discriminate an event type.

In step S901, the output document management unit 305 determines whether the event type is notification of change in the job state. If the output document management unit 305 determines that the event type is the notification of the change in the job state (YES in step S901), the processing proceeds to step S902. In step S902, the job state is updated, which is described below in detail, and the processing proceeds to step S906. In step S906, a file display is updated to update a display of the document file of which job state is changed, and the processing returns to step S900.

On the other hand, in step S901, if the output document management unit 305 determines that the event type is not the notification of the change in the job state (NO in step S901), the processing proceeds to step S903. In step S903, the output document management unit 305 determines whether the event type is an operation of editing (a change and movement of the document and update of additional information) of the document file. If the output document management unit 305 determines that the event type is the operation of editing (the change and movement of the document and update of the additional information) of the document file (YES in step S903), the processing proceeds to step S904. In step S904, the output document management unit 305 performs edit processing to the document file.

In step S905, the document management screen unit 302 updates the display of the changed document file. When a thumbnail is displayed in the document editing screen 601, the document management screen unit 302 updates the thumbnail. If a file attribute is displayed with, for example, an icon, the document management screen unit 302 changes a state of the icon. Accordingly, edited contents of the document file is reflected to the display on the screen.

In step S906, the CPU 200 update the file display to update the display of the document file in which job state is changed.

On the other hand, in step S903, if the output document management unit 305 determines that the event type is other than the above (NO in step S903), no update processing is performed on the display.

The update processing of the job state in step S902 of FIG. 9 is described below in detail.

Figure 10:
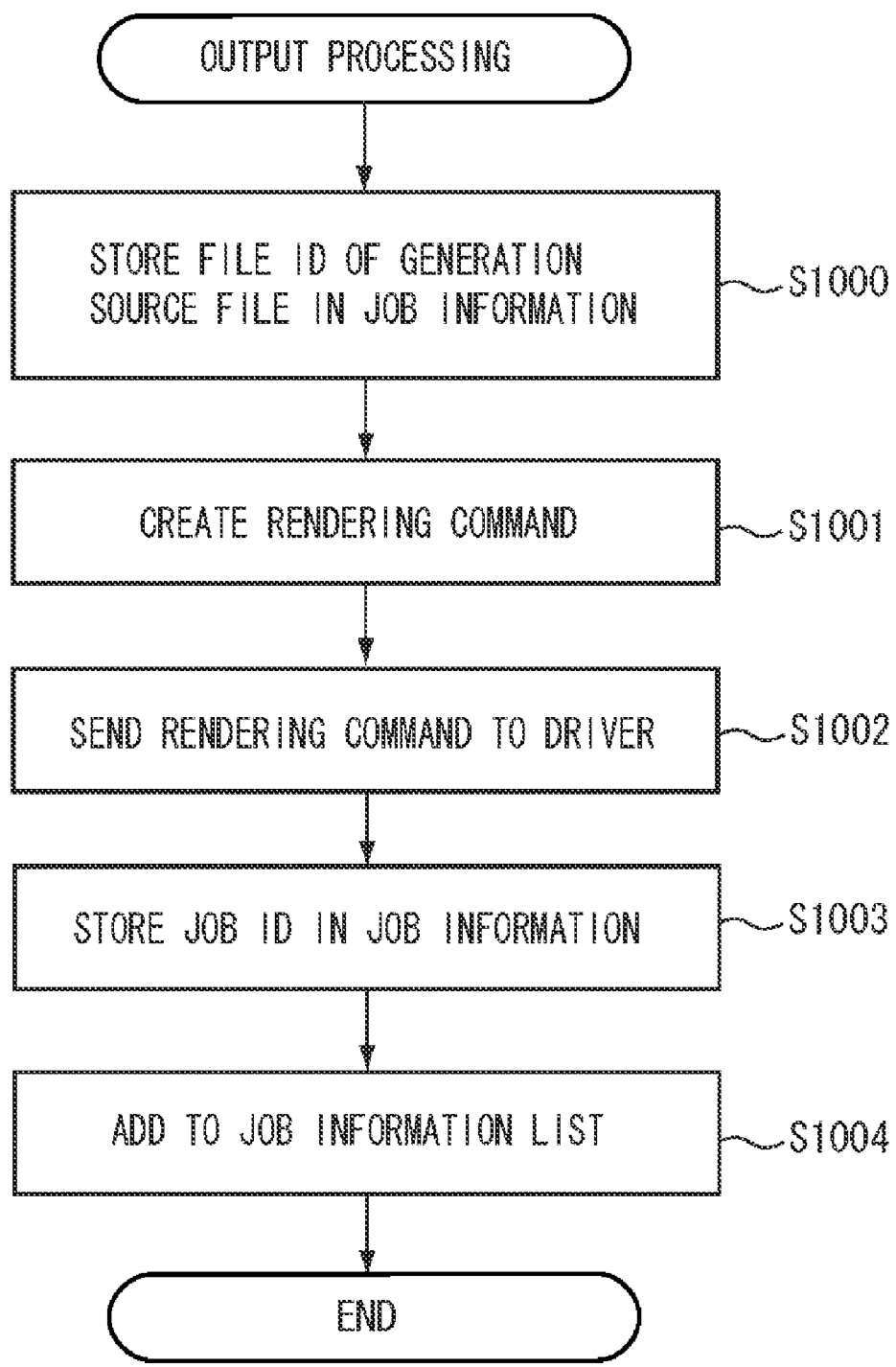
FIG. 10 is a flow chart illustrating an example of the data processing procedure in the information processing apparatus according to the exemplary embodiment of the present invention.

FIG. 10 is a flow chart illustrating an example of the data processing procedure in the information processing apparatus according to the exemplary embodiment of the present invention. In FIG. 10, the update processing of the job state in step S902 of FIG. 9 is exemplified. Steps S1000 through S1004 are each of the steps of the update processing. Each step is realized such that the CPU 200 of FIG. 2 loads the document management system 300 of FIG. 3 onto the RAM 201 and executes the loaded document management system 300. The job state is stored in the job information list as job information in which the job state is related to the job ID and the file ID. The processing when the output instruction, such as printing and facsimile transmission, in which the job information is generated is performed is described with reference to FIG. 10.

The processing is performed by the output control unit 304 according to the output instruction from the input management unit 301 after the input from the user via a mouse or the like is received by the input management unit 301 of the document management system 300.

In step S1000, when the output control unit 304 receives the output instruction from the input management unit 301, the file ID of the job generation source file is stored in the file ID of the job information. Subsequently, in step S1001, the output control unit 304 creates a rendering command which can be interpreted by the driver 307 to perform output.

In step S1002, the output control unit 304 sends the created rendering command to the driver 307. Accordingly, the job ID of the created job is returned from the driver 307. In step S1003, the output control unit 304 stores the job ID in the job information of FIG. 5A. In this manner, the job ID 500 is related to the file ID 501. A value indicating empty or a value indicating an initial state is stored by the output control unit 304 in the job state 502. In step S1004, the output control unit 304 adds the job information to the job information list and terminates the present processing.

Figure 11:
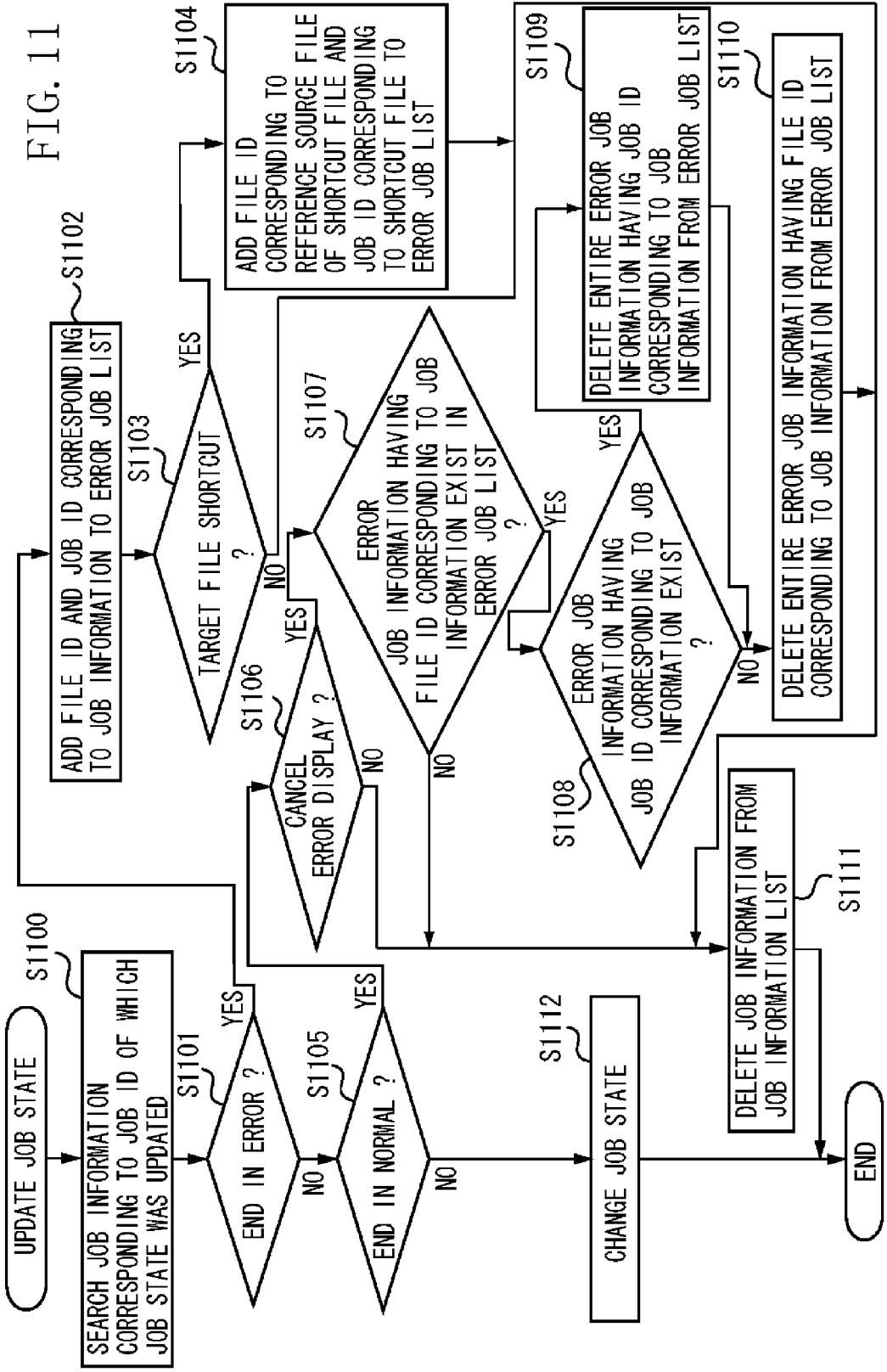
FIG. 11 is a flow chart illustrating an example of the data processing procedure in the information processing apparatus according to the exemplary embodiment of the present invention.

FIG. 11 is a flow chart illustrating an example of the data processing procedure in the information processing apparatus according to the exemplary embodiment of the present invention. FIG. 11 illustrates an example of updating the job state when a change of the job state is notified as an event. Steps S1100 through 1112 are each of steps of updating the job state. Each step is realized such that the CPU 200 of FIG. 2 loads the document management system 300 of FIG. 3 onto the RAM 201 and executes the loaded document management system 300. The image forming apparatus 101 notifies the job controlling service 310 of a change notification event of the job state. Upon receiving the notification, the job controlling service 310 notifies the output document management unit 305 of the document management system 300 of the changed job state and a job ID of the job. In the output document management unit 305, the following processing is performed.

In step S1100, the output document management unit 305 searches the job information list for job information including the job ID which received the change notification of the job state. In step S1101, the output document management unit 305 determines whether the notified job state indicates an error termination.

When the output document management unit 305 determines that the notified job state indicates the error termination (YES in step S1101), the processing proceeds to step S1102. In step S1102, the output document management unit 305 adds and stores the job ID and the file ID of the job information which were searched in step S1100 in the error job list illustrated in FIG. 5B as the error job information. In step S1103, the output document management unit 305 determines whether the file including the file ID 501, which was added to the error job list, is a shortcut file which does not contain entity data, i.e., a shortcut file via which the other file is referred to.

If the output document management unit 305 determines that the target file is the shortcut file which does not contain entity data (YES in step S1103), the processing proceeds to step S1104.

In step S1104, the output document management unit 305 acquires the file ID of the document file containing entity data which is referred to by the shortcut file. The output document management unit 305 stores the acquired file ID and the job ID notified from the job controlling service 310 in the error job information, and the error job information is added to the error job list.

Then in step S1111, the output document management unit 305 deletes the job information which was searched in the step S1100 from the job information list and terminates the present processing. In step S1103, if the output document management unit 305 determines that the target file is not a shortcut file (No in step S1103), the processing proceeds to step S1111.

On the other hand, in step S1101, if the output document management unit 305 determines that the job state does not indicates the error termination (NO in step S1101), the processing proceeds to step S1105.

In step S1105, the output document management unit 305 determines whether the notified job state indicates a normal termination. If the output document management unit 305 determines that the notified job state indicates the normal termination (YES in step S1105), the processing proceeds to step S1106.

In step S1106, the output document management unit 305 determines whether the output error display is set to be cancelled when the output normally terminates. If the output document management unit 305 determines that the output error display is set to be cancelled in the case of the normal termination (YES in step S1106), the processing proceeds to step S1107. On the other hand, if determination of the output document management unit 305 is other than the above (NO in step S1106), the processing proceeds to step S1111.

In step S1107, the output document management unit 305 determines whether there is error job information including the file ID which is identical to the file ID of the job information searched from the error job list in step S1100.

If the output document management unit 305 determines that there is the error job information as described above (YES in step S1107), the processing proceeds to step S1108. On the other hand, if determination of the output document management unit 305 is other than the above (NO in step S1107), the processing proceeds to step S1111.

In step S1108, the output document management unit 305 determines whether there is error job information including the job ID which is identical to the job ID of the job information searched in step S1100. If the output document management unit 305 determines that there is the error job information including the job ID which is identical to the job ID of the job information searched in step S1100 (YES in step S1108), the processing proceeds to step S1109.

In step S1109, the output document management unit 305 deletes the error job information from the error job list of FIG. 5B and the processing proceeds to step S1110. When the shortcut file is registered in the error job information, the entity file that the shortcut refers to is also registered in the error job list. Therefore, the processing is performed to delete the error job information of the entity file that the shortcut refers to.

In step S1108, if the output document management unit 305 determines that there is no error job information including the job ID which is identical to the job ID of the job information searched in step S1100 (NO in step S1108), the processing proceeds to step S1110.

In step S1110, the output document management unit 305 deletes, from the error job list, the entire error job information including the file ID which is identical to the file ID of the job information searched in step S1100, and the processing proceeds to step S1111.

Then in step S1111, the output document management unit 305 deletes the job information which was searched in the step S1100 from the job information list and terminates the present processing.

On the other hand, in step S1105, if the output document management unit 305 determines that the notified job state indicates a result other than the normal termination (NO in step S1105), the processing proceeds to step S1112.

A case where the processing proceeds to step S1112 is when the job state notified by the event indicates neither the error termination nor the normal termination, i.e., the output processing is continuing.

In step S1112, the output document management unit 305 changes the job state of the job information searched in step S1100 to the job state notified from the event and terminates the present processing.

In processing of step S1103, it can be determined that an icon of a shortcut file for referring to the entity data of the document file or a shortcut folder is displayed in the user interface of FIG. 6. Accordingly, the icon can be changed to the error display state according to the acquired job ID, in which an error occurs, with respect to the icon of the shortcut file or the shortcut folder.

In the present exemplary embodiment, it is described a case where a display state of the folder which stores the document file including error is changed to the error display state. However, a folder in an upper layer than the folder storing the document file, in which the error occurred, may be displayed.

When the folder relating to the document file in which the error occurred is not directly displayed, the document management screen unit 302 performs display control to change a display state of the folder in the upper layer to the error display state. Accordingly, even when the folder storing the document file in which the error occurred is not displayed, presence of the document file in which the error occurred can be confirmed by the user by following up the related upper folders.

Figure 12:
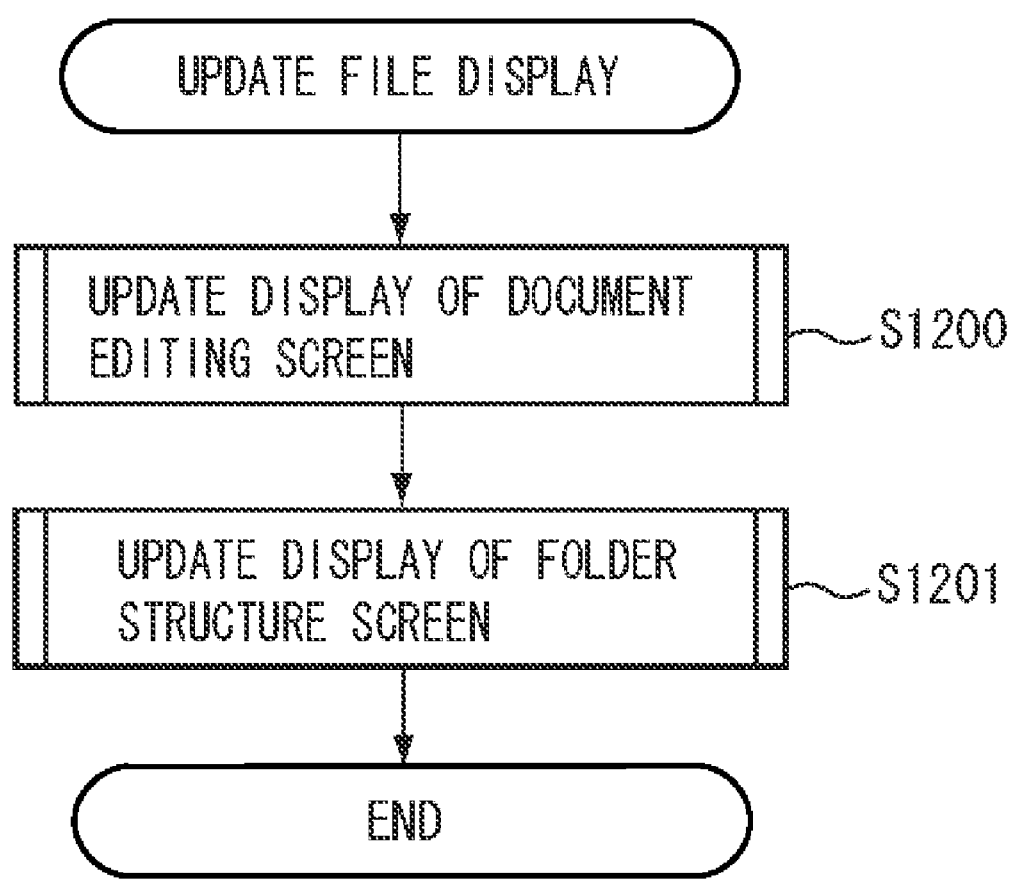
FIG. 12 is a flow chart illustrating an example of the data processing procedure in the information processing apparatus according to the exemplary embodiment of the present invention.

FIG. 12 is a flow chart illustrating an example of the data processing procedure in the information processing apparatus according to the exemplary embodiment of the present invention. In FIG. 12, an example of the update processing of the file display in step S904 is illustrated. Steps S1200 and S1201 are each of steps of updating the file display in step S904. Each step is realized such that the CPU 200 of FIG. 2 loads the document management system 300 of FIG. 3 onto the RAM 201 and executes the loaded document management system 300.

Figure 13:
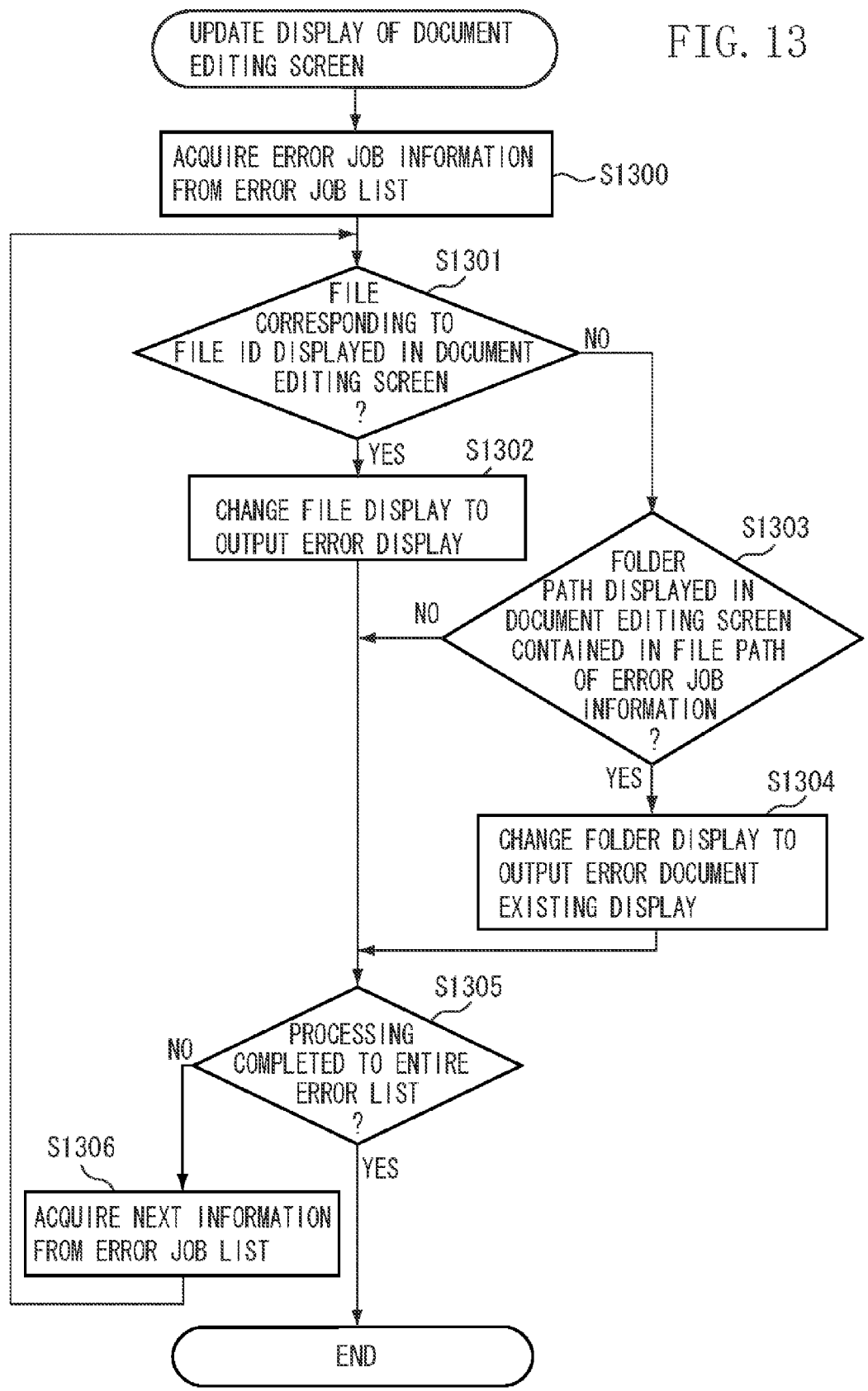
FIG. 13 is a flow chart illustrating an example of the data processing procedure in the information processing apparatus according to the exemplary embodiment of the present invention.

In step S1200, in the update processing of display, the document management screen unit 302 updates the document editing screen 601 displayed on the display 208 according to steps illustrated in FIG. 13. In step S1201, the document management screen unit 302 updates the display of the folder structure screen 600 displayed on the display 208 according to steps illustrated in FIG. 14 and terminates the present processing.

In the updated content, the update state is displayed on the display by the document management screen unit 302.

FIG. 13 is a flow chart illustrating an example of the data processing procedure in the information processing apparatus according to the exemplary embodiment of the present invention. In FIG. 13, an example of updating the display of the document editing screen 601 in step S1200 is illustrated. Steps 1300 through s1306 are each of steps of updating the display. Each step is realized such that the CPU 200 of FIG. 2 loads the document management system 300 of FIG. 3 onto the RAM 201 and executes the loaded document management system 300.

In step S1300, the output document management unit 305 acquires a piece of error job information from the error job list of FIG. 5B. In step S1301, the output document management unit 305 determines whether the file including the file ID 501 of the error job information acquired in step S1300 is presently displayed in the document editing screen 601. In other words, the output document management unit 305 determines whether the file including the file ID 501 of the error job information acquired in step S1300 exists in the folder which is selected in the folder structure screen 600.

If the output document management unit 305 determines that there is the file including the same file ID (YES in step S1301), the processing proceeds to step S1302.

In step S1302, the document management screen unit 302 changes the display of the file to be displayed on the display 208 to the output error display (error display state) according to the instruction of the output document management unit 305 and the processing proceeds to step S1305. The output error display can be displayed by, for example, a method to add an output error display icon on a thumbnail of the file or a method to change the file icon itself to an icon indicating the output error display.

On the other hand, if the output document management unit 305 determines that the file including the file ID of the error job information acquired in step S1300 is not presently displayed in the document editing screen 601 (NO in step S1301), the processing proceeds to step S1303.

In step S1303, the output document management unit 305 determines whether a folder path is included in a file path which includes the file ID of the error job information with respect to the folder displayed in the document editing screen 601. If the output document management unit 305 determines that the folder path is included in the file path which includes the file ID of the error job information (YES in step S1303), the processing proceeds to step S1304. If determination of the output document management unit 305 is other than the above (NO in step S1303), the processing proceeds to step S1305.

In step S1304, the document management screen unit 302 changes the display of the folder to an output error document existing display according to an instruction of the output document management unit 305 and the processing proceeds to step S1305.

In step S1305, the output document management unit 305 determines whether the processing in steps S1301 through S1304 are completed to the entire error job information stored in the error job list. If the output document management unit 305 determines that the processing has been completed to the entire error list (YES in step S1305), the present processing is terminated. If determination of the output document management unit 305 is other than the above (NO in step S1305), the processing proceeds to step S1306.

In step S1306, the output document management unit 305 acquires next information from the error job list and the processing returns to step S1301.

According to the above described processing, if the file in which an output error occurred exists in the document editing screen 601, the file is displayed with the output error display. If the folder containing the file in which an output error occurred exists in the document editing screen 601, the folder is displayed with the output error document existing display.

Figure 14:
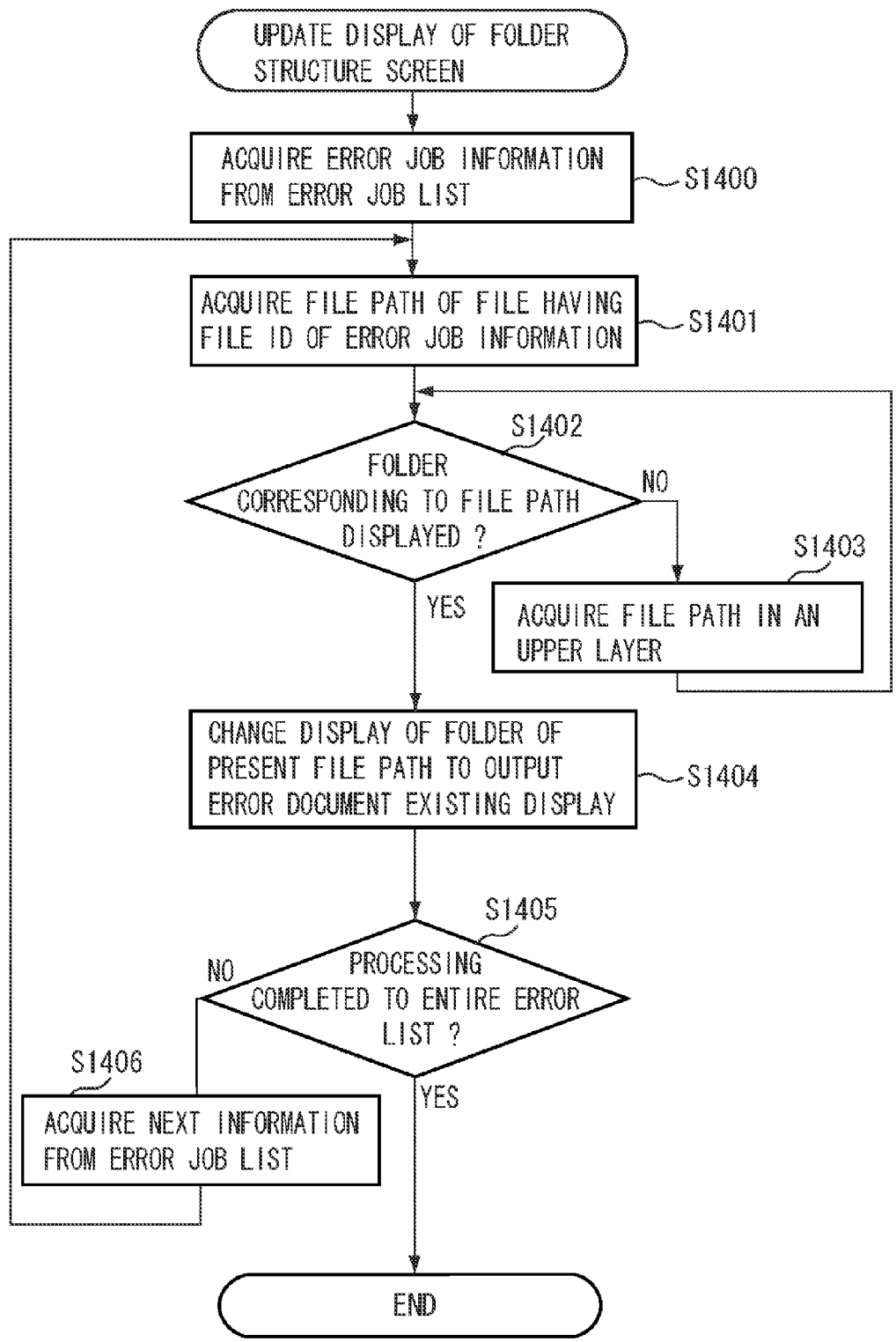
FIG. 14 is a flow chart illustrating an example of the data processing procedure in the information processing apparatus according to the exemplary embodiment of the present invention.

FIG. 14 is a flow chart illustrating an example of the data processing procedure in the information processing apparatus according to the exemplary embodiment of the present invention. FIG. 14 illustrates an example of updating the display of the folder structure screen 600 in step S1201. Steps S1400 through S1406 are each of steps of updating the display. Each step is realized such that the CPU 200 of FIG. 2 loads the document management system 300 of FIG. 3 onto the RAM 201 and executes the loaded document management system 300.

In step S1400, the output document management unit 305 acquires a piece of error job information from the error job list of FIG. 5B. In step S1401, the output document management unit 305 acquires a file path of the file including the file ID of the error job information acquired in step S1400.

In step S1402, the output document management unit 305 determines whether the folder including the file path acquired in step S1401 is displayed on the folder structure screen 600. If the output document management unit 305 determines that there is no corresponding folder (NO in step S1402), the processing proceeds to step S1403. Then in step S1403, the output document management unit 305 changes the file path to a file path in an upper layer and the processing returns to step S1402.

More specifically, for example, a path of C:¥A¥B¥C is changed to a path of C:¥A¥B, which is an upper layer. Then, the processing of steps of S1402 and S1403 are repeated by using the path. Accordingly, the path closest to the file in which the output error occurred can be acquired in the displayed folders.

On the other hand, in step S1402, if the output document management unit 305 determines that there is a corresponding folder in folders displayed on the folder structure screen 600 (YES in step S1402), the processing proceeds to step S1404.

In step S1404, the document management screen unit 302 changes the display state of the folder to the output error document existing display according to the instruction of the output document management unit 305.

In step S1405, the output document management unit 305 determines whether the processing in steps S1401 through S1404 are completed to the entire error job information stored in the error job list. If the output document management unit 305 determines that the processing has been completed to the entire error list (YES in step S1405), the present processing is terminated. If determination of the output document management unit 305 is other than the above (NO in step S1405), the processing proceeds to step S1406.

In step S1406, the output document management unit 305 acquires next information from the error job list and the processing returns to step S1401.

According to the above described processing, the output error document existing display is always displayed on the folder structure screen 600 when the output error occurs and thus the occurrence of the output error can be notified to the user. The display update processing of the folder structure screen 600 of FIG. 14 is performed at every event in which the display of the folder structure screen 600 is updated.

Figure 15:
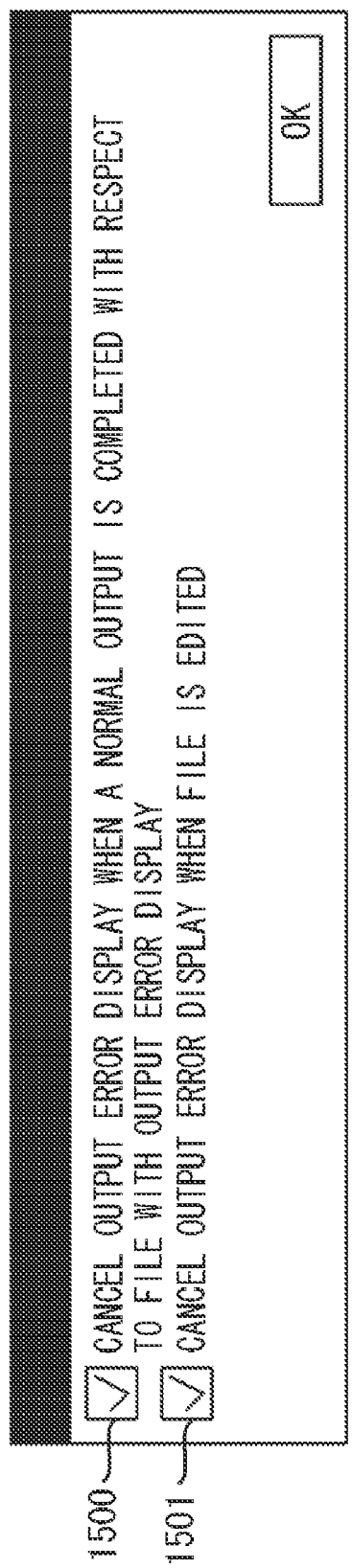
FIG. 15 illustrates an example of a user interface displayed on a display of FIG. 3.

FIG. 15 illustrates an example of the user interface displayed on the display 208 of FIG. 3. FIG. 15 illustrates an example of the user interface for setting timing at which the output error display is to be cancelled.

The user sets a method for canceling the output error display by using the user interface illustrated in FIG. 15 displayed on the display 208. Accordingly, the output error display is cancelled by the processing of the output document management unit 305 or the document edit processing unit 306 from the input management unit 301 of the document management system 300.

In FIG. 15, a check box 1500 is checked to cancel the output error display when the output processing is performed again to the file of which output processing was ended in error and thus is displayed with the output error display and the output processing is normally completed.

When the check box 1500 is checked, a second mode is set and the processing of steps S1107 through S1110 of FIG. 11 is performed and the error display is cancelled when the output processing is normally ended.

A check box 1501 is checked when the output error display is cancelled when some edit operation is performed to the file currently displayed with the output error display. When the check box 1501 is checked, a first mode is set and the processing of FIG. 16 is performed when the file is edited, and the output error display is cancelled.

The cancellation timing illustrated in FIG. 15 is a mere example, and thus the cancellation timing can be set by the other processing. Further, the user can arbitrarily issue a cancellation instruction.

Figure 16:
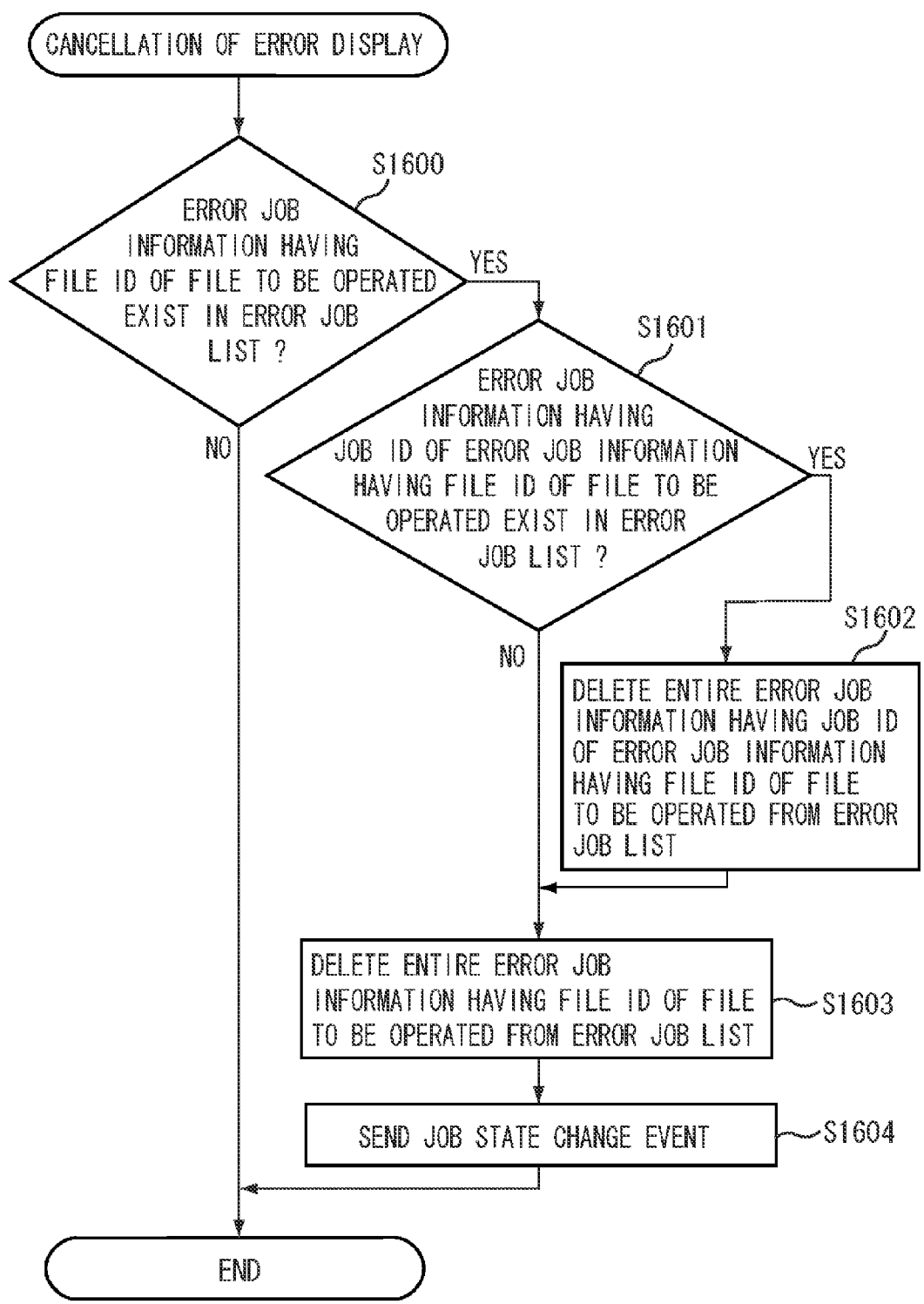
FIG. 16 is a flow chart illustrating an example of a data processing procedure in the information processing apparatus according to the exemplary embodiment of the present invention.

FIG. 16 is a flow chart illustrating an example of the data processing procedure in the information processing apparatus according to the exemplary embodiment of the present invention. FIG. 16 illustrates an example of cancellation processing of the error display which is executed at the timing set in the user interface of FIG. 15. Steps S1600 through S1604 are each of steps of the cancellation processing. Each step is realized such that the CPU 200 of FIG. 2 loads the document management system 300 of FIG. 3 onto the RAM 201 and executes the loaded document management system 300.

In step S1600, the output document management unit 305 determines whether there is error job information including the file ID which is identical to that of the file to be operated in the error job list of FIG. 5B. If the output document management unit 305 determines that there is no error job information including the file ID which is identical to that of the file to be operated in the error job list (NO in step S1600), the present processing is terminated.

On the other hand, in step S1600, if the output document management unit 305 determines that there is the error job information including the file ID which is identical to that of the file to be operated in the error job list (YES in step S1600), the processing proceeds to step S1601.

In step S1601, the output document management unit 305 determines whether there is the error job information including the job ID of the error job information which has the file ID of the file to be operated in the error job list.

If the output document management unit 305 determines that there is the error job information including the job ID of the error job information which has the file ID of the file to be operated in the error job list (YES in step S1601), the processing proceeds to step S1602.

In step S1602, the output document management unit 305 deletes the error job information including the job ID from the error job list and the processing proceeds to step S1603.

On the other hand, when the output document management unit 305 determines that there is no error job information including the job ID of the error job information which has the file ID of the file to be operated in the error job list (NO in step S1601), the processing proceeds to step S1603.

In step S1603, the output document management unit 305 deletes the entire error job information including the file ID which is identical to that of the file to be operated from the error job list. Since the file including the file ID which is stored in the error job information listed in the error job list is displayed with the output error display, the output error display can be cancelled by deleting the error job information from the error job list.

In step S1604, an event for changing the job state is sent to the document management system and the present processing is terminated. By sending the event, the update processing of the file display of FIG. 9 is performed again, and the output error display illustrated in FIGS. 7 and 8 are cancelled.

In FIG. 15, the check box 1500 is the user interface for setting to cancel the output error display when the output processing is performed again to the file of which output processing was ended in error and thus is displayed with the output error display and the output processing is normally completed. When the setting is enabled, the processing in steps S1107 through S1110 of FIG. 11 is performed and the error display is cancelled when the output processing is normally completed. The check box 1501 is the user interface for setting to cancel the output error display when some edit operation is performed to the file displayed with the output error display. When the setting is enabled, the processing of FIG. 16 is performed when the file is edited and the output error display is cancelled. The cancellation timing illustrated in FIG. 15 is a mere example, and thus the cancellation timing can be set by the other processing. Further, the user can arbitrarily issue a cancellation instruction.

In the above exemplary embodiment, the display control in which the display state of the folder corresponding to the document file in which an error occurred is changed to the error display state is described. However, the display state may be changed when the layer of the icon or the folder is moved to the other layer by a file operation by the user.

In such a case where the folder or the document file is instructed to move into the other layer, a table for reflecting, in the document file or the folder, the occurrence of the error in the other layer into which the folder or the document file is moved may be created, so that a similar effect as described above can be realized.

A configuration of a data processing program which is readable by the information processing apparatus according to the present invention is described with reference to a memory map illustrated in FIG. 17.

FIG. 17 illustrates the memory map of a storage medium which stores various data processing programs readable by the information processing apparatus according to the present invention.

Although not specifically illustrated, information, e.g., version information or a creator name information, for managing a program group which is stored in the storage medium may be stored and information depending on the OS of a program reading side, e.g., an icon for identifying and displaying the program, may be stored.

Further, data belonging to the various programs is also managed by the above described directory. Further, when a program for installing various programs into a computer or a program to be installed is compressed, a program for decompressing the above program may be stored in the storage medium.

The present invention is not limited to the above described exemplary embodiments, but can be provided with various modifications (including an organic combination of each of the exemplary embodiments) based on the spirit of the present invention. Such modifications would not be excluded from the scope of the claims of the present invention.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-003627, filed Jan. 9, 2009, which is hereby incorporated by reference herein in its entirety.

What is claimed is:

1. An information processing apparatus which manages a plurality of document files stored in a memory, the information processing apparatus comprising:
at least one processor coupled via a bus to a memory, the processor being programmed to control one or more of:
a display control unit configured to control to display icons corresponding to the plurality of document files on a display unit;
an output control unit configured to convert, when an output instruction is requested for one of the icons displayed on the display unit, the document file of the requested icon into rendering commands, and to send the rendering commands to a driver; and
an output document management unit configured to manage a job information list that stores information which relates a file ID of the document file which is converted by the output control unit with a job ID of an output job to be created based on the rendering command by the driver, and to receive job state information from a job controlling service which monitors the output job,
wherein, when the output document management unit receives the job state information indicating that an output process for the output job ends in error state, the display control unit changes an icon display state of the icon of the document file corresponding to the file ID which is specified by the job ID of which the job state information is in the error state, from a normal display state to an error display state.

2. The information processing apparatus according to claim 1, further comprising a setting unit configured to set a condition in which the icon display state of the icon of the document file is changed from the error display state to the normal display state.

3. The information processing apparatus according to claim 2, wherein the setting unit sets, as the condition, either one of a first mode in which the error display state is changed to the normal display state when the icon of the document file of the error display state is designated or a second mode in which the error display state is changed to the normal display state when the document file of the error display state is output again and results in a normal termination, and wherein the display control unit changes the icon display state of the document file from the error display state to the normal display state according to the first mode or the second mode set by the setting unit.

4. The information processing apparatus according to claim 1, wherein the icon of the document file is an icon of a shortcut file which refers to an entity file of the document file.

5. The information processing apparatus according to claim 4, wherein the display control unit changes the icon display states of an icon of the shortcut file corresponding to the file ID which is specified by the job ID of which the job state information is in the error state and the icon of the document file that the shortcut file refers to, from the normal display state to the error display state.

6. An information processing apparatus which manages a plurality of document files stored in a folder, the information processing apparatus comprising:
at least one processor coupled via a bus to a memory, the processor being programmed to control one or more of:
a display control unit configured to control to display icons corresponding to the plurality of document files and icons corresponding to the folder on a display unit;
an output control unit configured to convert, when an output instruction is requested for one of the icons of the document files displayed on the display unit, the document file of the requested icon into rendering commands, and to send the rendering commands to a driver; and
an output document management unit configured to manage a job information list that stores information which relates a file ID of the document file which is converted by the output control unit with a job ID of an output job to be created based on the rendering command by the driver, and to receive job state information from a job controlling service which monitors the output job,
wherein, when the output document management unit receives the job state information indicating that an output process for the output job ends in error state, the display control unit changes at least one of an icon display state of the icon of the document file corresponding to the file ID which is specified by the job ID being in the error state and an icon display state of the icon of the folder which stores the document file corresponding to the file ID which is specified by the job ID being in the error state, from a normal display state to an error display state.

7. The information processing apparatus according to claim 6, further comprising:
a determination unit configured to determine, when the output document management unit receives the job state information of the job ID from the job controlling service, whether the icon of the document file corresponding to the received job ID is displayed on the display unit,
wherein the display control unit changes the icon display state of the folder which stores the document file, from the normal display state to the error display state when the determination unit determines that the document file corresponding to the received job ID is not displayed on the display unit.

8. The information processing apparatus according to claim 6, further comprising a setting unit configured to set a condition in which the icon display states of the icon of the document file and the icon of the folder are changed from the error display state to the normal display state, wherein the display control unit changes the icon display states of the icon of the document file and the icon of the folder, from the error display state to the normal display state according to the condition set by the setting unit.

9. A method for controlling a display in an information processing apparatus which manages a plurality of document files stored in a memory, the method comprising:
controlling to display icons corresponding to the plurality of document files, by a display control unit, on a display unit;
converting, by an output control unit, when an output instruction is requested for one of the icons displayed on the display unit, the document file of the requested icon into rendering commands, and sending the rendering commands to a driver; and
managing, by an output document management unit, a job information list that stores information which relates a file ID of the document file which is converted by the output control unit with a job ID of an output job to be created based on the rendering command by the driver, and receiving job state information from a job controlling service which monitors the output job,
wherein, when the output document management unit receives the job state information indicating that an output process for the output job ends in error state, the controlling step changes an icon display state of the icon of the document file corresponding to the file ID which is specified by the job ID of which the job state information is in the error state, from a normal display state to an error display state.

10. The method according to claim 9, further comprising setting a condition which changes the icon display state of the icon of the document file from the error display state to the normal display state.

11. The method according to claim 10, further comprising setting, as a condition, either one of a first mode in which the error display state is changed to the normal display state when the icon of the document file of the error display state is designated or a second mode in which the error display state is changed to the normal display state when the document file of the error display state is output again and results in a normal termination, and wherein the controlling step changes the icon display state of the document file from the error display state to the normal display state according to the first mode or the second mode set by the setting unit.

12. The method according to claim 9, wherein the icon of the document file is an icon of a shortcut file which refers to an entity file of the document file.

13. A computer-readable storage medium storing a program which causes a computer to execute a method according to claim 9.

14. A method for controlling a display in an information processing apparatus which manages a plurality of document files to be stored in a folder, the method comprising:
controlling to display icons corresponding to the plurality of document files and icons corresponding to the folder, by a display control unit, on a display unit;
converting, by an output control unit, when an output instruction is requested for one of the icons of the document files displayed on the display unit, the document file of the requested icon into rendering commands, and sending the rendering commands to a driver; and
managing, by an output document management unit, a job information list that stores information which relates a file ID of the document file which is converted by the output control unit with a job ID of an output job to be created based on the rendering command by the driver, and receiving job state information from a job controlling service which monitors the output job,
wherein, when the output document management unit receives the job state information indicating that an output process for the output job ends in error state, the controlling step changes at least one of an icon display state of the icon of the document file corresponding to the file ID which is specified by the job ID being in the error state and an icon display state of the icon of the folder which stores the document file corresponding to the file ID which is specified by the job ID being in the error state, from a normal display state to an error display state.

15. The method according to claim 14, further comprising:
determining when the output document management unit receives the job state information of the job ID from the job controlling service, whether the icon of the document file corresponding to the received job ID is displayed on the display unit; and
changing the icon display state of the folder which stores the document file, from the normal display state to the error display state when it is determined that the document file corresponding to the received job ID is not displayed on the display unit.

16. The method according to claim 15, further comprising changing the icon display states of an icon of the shortcut file corresponding to the file ID which is specified by the job ID of which the job state information is in the error state and the icon of the document file that the shortcut file refers to, from the normal display state to the error display state.

17. The method according to claim 14, further comprising setting a condition in which the icon display states of the icon of the document file and the icon of the folder are changed from the error display state to the normal display state, wherein the controlling step changes the icon display states of the icon of the document file and the icon of the folder, from the error display state to the normal display state according to the condition set by the setting step.

18. A computer-readable storage medium storing a program which causes a computer to execute a method according to claim 14.

* * * * *